May 22, 1956 E. F. STOVER 2,746,296
GAGE FOR FLOWMETERS
Filed July 14, 1950 3 Sheets-Sheet 1
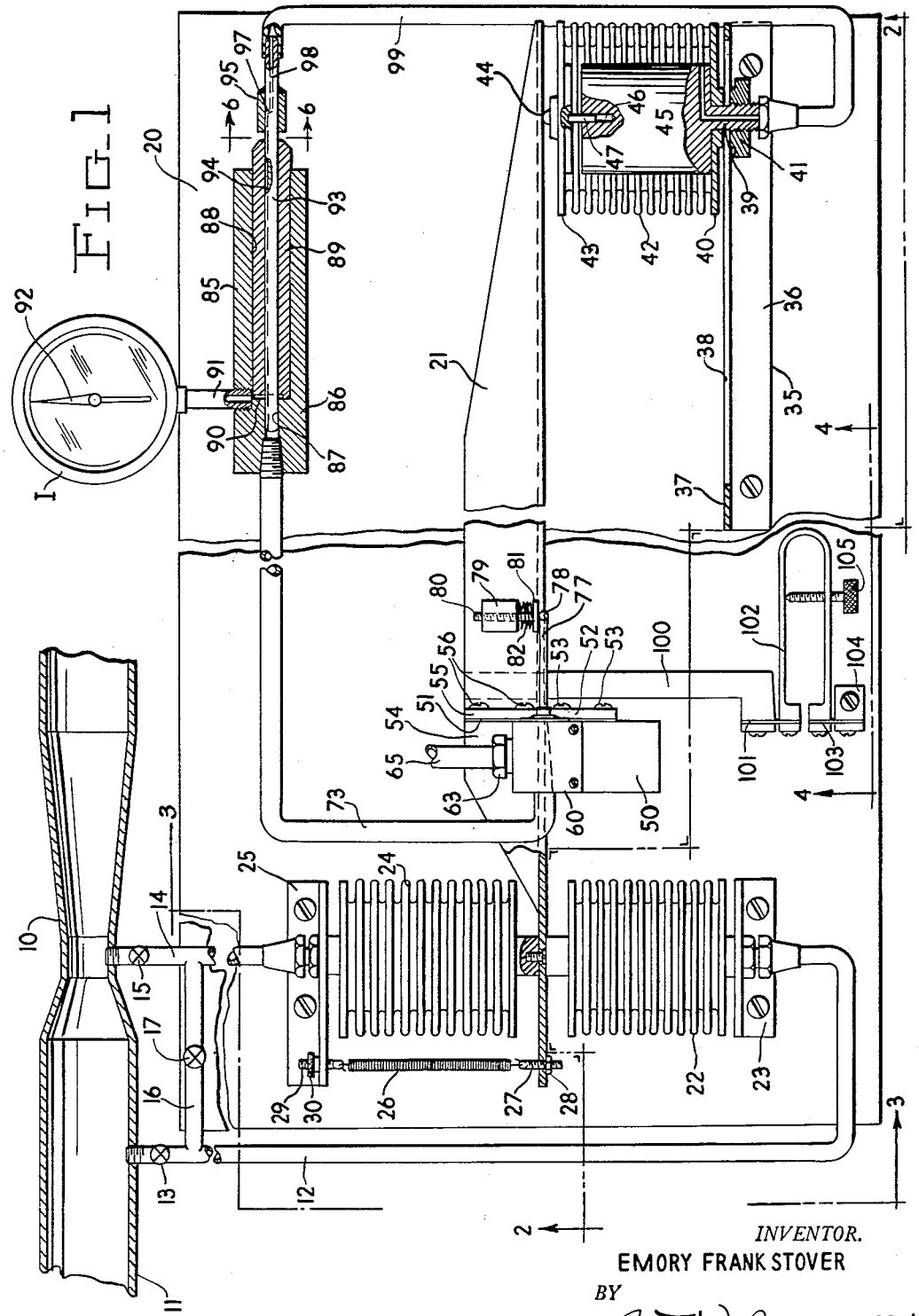
INVENTOR.
EMORY FRANK STOVER
BY
B.T Wobensmith
ATTORNEY May 22, 1956  E. F. STOVER  2,746,296
GAGE FOR FLOWMETERS
Filed July 14, 1950  3 Sheets-Sheet 2
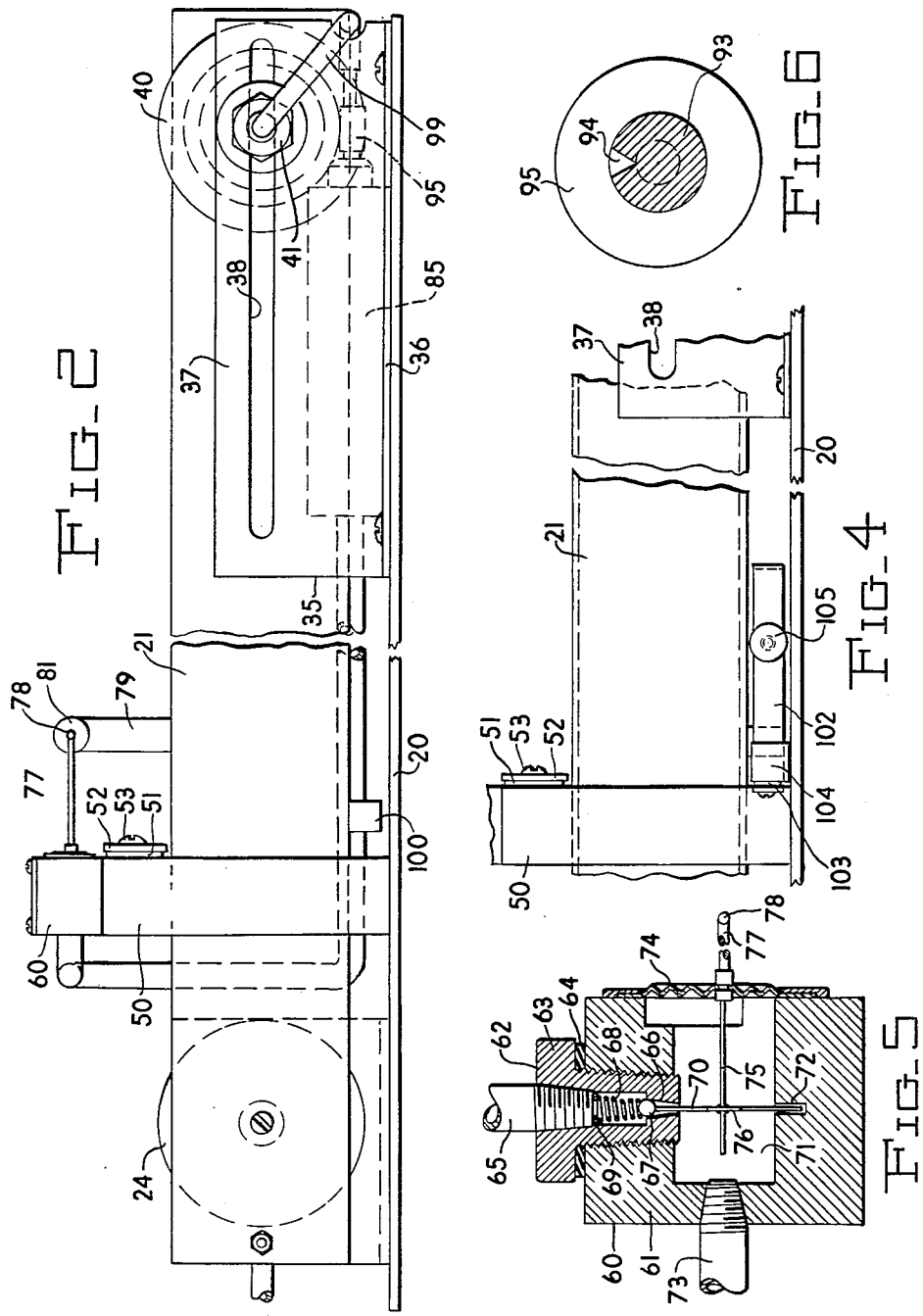
INVENTOR.
EMORY FRANK STOVER
BY
ATTORNEY May 22, 1956  E. F. STOVER  2,746,296
GAGE FOR FLOWMETERS
Filed July 14, 1950  3 Sheets-Sheet 3
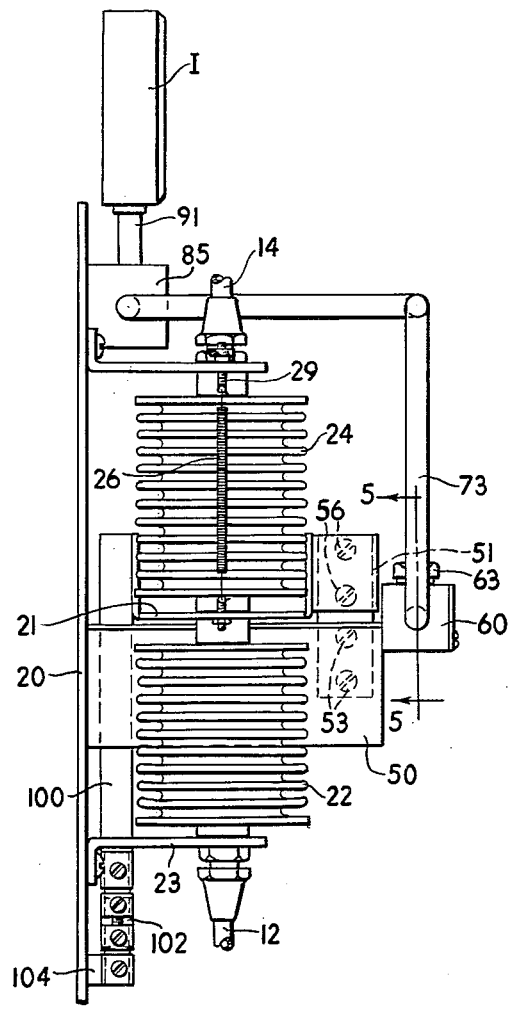
INVENTOR.
EMORY FRANK STOVER
BY
ATTORNEY

United States Patent Office 2,746,296
Patented May 22, 1956

2,746,296
GAGE FOR FLOWMETERS

Emory Frank Stover, Wynnewood, Pa.

Application July 14, 1950, Serial No. 173,704

7 Claims. (Cl. 73—407)

This invention relates to flow meters and more particularly fluid flow meters for use in connection with primary metering elements such as Venturi tubes, orifices, nozzles, and Pitot tubes.

This invention further relates to apparatus for measuring and indicating variations in conditions and forces where it is desired to obtain a square root relation of the condition or force to be measured.

It is the principal object of the present invention to provide an improved fluid meter for directly obtaining a square root relation of a differential pressure or force.

It is a further object of the present invention to provide improved apparatus employing laminar flow of a pilot fluid in a tube with improved provisions for obtaining the laminar flow and with which a low air consumption of the meter is made available.

It is a further object of the present invention to provide a flow meter in which an initial force is applied to a responsive element in opposition to a force produced by laminar flow for obtaining an indication proportional to the square root of the initial force.

Other objects and advantageous features of the invention will be apparent from the specification and claims.

The nature and characteristic features of the invention will be more readily understood from the following description, taken in connection with the accompanying drawings forming part hereof, in which:

Figure 1 is a vertical view partly in elevation and partly in vertical section illustrating the main features of the present invention;

Fig. 2 is a fragmentary sectional view taken approximately on line 2—2 of Fig. 1;

Fig. 3 is a fragmentary sectional view taken approximately on line 3—3 of Fig. 1;

Fig. 4 is a fragmentary sectional view taken approximately on line 4—4 of Fig. 1;

Fig. 5 is a fragmentary sectional view, enlarged, taken approximately on line 5—5 of Fig. 3; and Fig. 6 is a fragmentary sectional view, enlarged, taken approximately on line 6—6 of Fig. 1.

It should of course, be understood that the description and drawings herein are illustrative merely, and that various modifications and changes may be made in the structure disclosed without departing from the spirit of the invention.

Like numerals refer to like parts throughout the several views.

Referring more particularly to the drawings, in which a preferred embodiment of the invention is illustrated, a primary metering device is shown which is adapted for obtaining a differential pressure or force derived from fluid flow through conduits in which Venturi tubes, orifices, nozzles or Pitot tubes are connected or from Pitot tubes employed for obtaining the speed of ships, airplanes, or the like. For purposes of explanation the primary metering device is shown in the form of a venturi tube 10, connected in a conduit 11, for measuring the rate of flow of flow through the conduit 11.

The upstream or high pressure side of the primary metering device 10 has a pipe 12 connected thereto, a shut-off valve 13 being provided in the pipe 12. The downstream or lower pressure portion of the primary metering device 10 has a pipe 14 connected thereto, a shut-off valve 15 being provided in the pipe 12. The pipes 12 and 14 are connected by a by-pass pipe 16, having a shut-off valve 17 interposed therein.

A mounting or supporting plate 20 is provided having a pivoted lever 21 mounted thereon, as hereinafter more fully explained. At one end of the lever 21, a flexible metallic bellows 22 is provided in engagement at its free end with the lever 21 for applying a force thereon. The other end of the flexible metallic bellows 22 is secured to a fixed supporting bracket 23 secured to the plate 20. The pipe 12 is connected in communication with the interior of the bellows 22.

A second flexible metallic bellows 24 is provided, preferably axially alined with the bellows 22 and having its free end in engagement with the lever 21 for applying a force on the lever 21 in opposition to the force applied by the bellows 22. The bellows 24 is preferably supported at its opposite end by a bracket 25 secured to the plate 20. The pipe 14 is in communication with the interior of the bellows 24.

The bellows 22 and 24 are preferably of equal effective area so that the differential of the pressure from the primary metering device 10 is effective as a resultant force applied on the lever 21.

A calibrating or zero setting spring 26 may be provided, having one end adjustably connected by a threaded stud 27 and nut 28 to the lever 21 and the other end connected by a threaded stud 29 and nut 30 to the bracket 25, secured to the plate 20.

An additional supporting bracket 35 is provided on the plate 20 having a vertical securing flange 36 and a horizontal supporting flange 37. The supporting flange 37 is provided, intermediate its ends, with a slot 38 for the reception of a clamping sleeve 39 which extends downwardly from a bellows supporting plate 40. A nut 41 is provided, in threaded engagement with the sleeve 39 for permitting of the clamping of the plate at the desired location along the slot 38. The bellows plate 40 has mounted thereon in fluid-tight relation, a flexible metallic bellows 42, the upper or free end of which is provided with a bellows closure plate 43 mounted in fluidtight relation with respect to the bellows 42. On the exterior of the bellows plate 43, a contact ball 44 is provided, for engagement with the lever 21, and for transmitting to the lever 21 the force applied by the bellows 42, as hereinafter explained.

The interior of the bellows 42, for reducing the interior volume thereof, a block 45 is provided having a guide opening 46 therein for guiding a pin 47 carried by the bellows plate 43 and preventing sidewise displacement of the bellows plate 43.

The lever 21 may be supported in any desired friction free manner such as on a fulcrum, and for this purpose a mounting block 50 is preferably provided, secured to the plate 20 in any desired manner. The fulcrum strip or plate 51 is preferably clamped to the block 50 by a clamping plate 52, held in position by screws 53, and is clamped to a vertical side extension 54, formed on the lever 21, by a clamping plate 55, which is held in position by screws 56.

A pilot valve 60 is provided and has a casing 61 which may be mounted on and supported by the block 50. The casing 61 is provided, at the upper portion thereof, with a plug 62, the plug having an enlarged head 63 of hexagonal or other preferred exterior shape, for tightening the same into position in the casing 61. A resilient washer 64 is interposed between the head 63 and the casing 61 for preventing fluid leakage. The plug 62 has connected thereto a pilot fluid supply pipe 65, which is adapted to be connected to any suitable source of fluid, such as air, under pressure.

Within the interior of the plug 62, and at the inner end thereof, a valve seat port 66 is provided for engagement by a valve member 67. The valve member 67 is normally urged to closed position by a spring 68 in engagement therewith, the opposite end of the spring 68 being in engagement with a fixed abutment 69 carried in the interior of the plug 62. The valve member 67 has a valve stem 70 in engagement therewith, and extending through the valve seat port 66 and into a chamber 71 formed in the interior of the casing 61. The valve stem 70 may be guided at its lower end in a guiding opening 72.

The chamber 71, at one side thereof, has a fluid delivery pipe 73 connected thereto and is closed by a diaphragm 74 which is secured thereto in fluidtight relation. The diaphragm 74 preferably has extending therethrough an actuating lever 75 which extends through a suitable eye 76 formed in the valve stem 70 and has an exteriorly disposed end 77 with a ball portion 78. An actuating block 79 is secured to the lever 21 and has a threaded stem 80 in engagement therewith, an actuating head 81 being provided on the lower end of the stem 80 for engagement with the ball 78 of the actuating lever 75. A spring 82 may be interposed between the block 80 and the head 81 for holding the head 81 in predetermined adjusted position.

The mounting plate 20 also has secured thereto a laminar flow tube 85, the details of which will now be pointed out. The laminar flow tube 85 preferably includes an outer tubular housing 86 having an interior bore 87 and a larger interior bore 88 extending therefrom. The end of the bore 87 has the fluid delivery pipe 73 connected thereto. Within the bore 88, a sleeve 89 is provided, having a vent or take-off opening 90 at the inner end thereof in communication with a pipe 91, and the pipe 91 being connected to an instrument I, of any desired type, for indicating, recording or controlling. A pressure gage, having a movable indicator arm 92 is shown merely for purposes of illustration.

Within the sleeve 89 and the bore 87, a rod 93 is provided in engagement therein with a tight sliding fit. The rod 93 is provided therealong with an axially extending capillary groove 94 extending inwardly from its peripheral surface as shown more in detail in Fig. 6. The capillary groove 94 is of a size and of a length, to provide for laminar flow therealong. The laminar flow is established between the inner end of the rod 93 and the vent 90 and maintained therealong to the outer end.

On the outer end of the rod 93, a collar 95 is provided, with its end face a predetermined distance from the outer end of the sleeve 89. The collar 95 is fastened on rod 93 to provide a fluidtight connection at the outer end. The outer end of the sleeve 89 is preferably beveled to avoid any obstruction to fluid flow discharging from the groove 94. It will be noted that the space between the end of the sleeve 89 and the facing end of the collar 95 provides an adjustable atmospheric gap. The rod 93, in the interior of the collar 95, has a radially extending passageway 97 in communication with a central axially extending passageway 98, the passageway 98 being connected by a flexible pipe 99 to the sleeve 39. It will be noted that the portion of the groove 94 within the collar 95 serves as an impact opening, for purposes to be explaned.

In order to increase the sensitivity and to balance the various spring forces applied on the lever 21, an arm 100 is secured to the lever 21 which is connected at its other end to a spring strip 101. The spring strip 101 is connected to one end of a U-shaped spring 102, the other end of the spring 102 being connected by a spring strip 103, similar to the spring strip 101, to a block 104 fixedly mounted on the supporting plate 20. An adjusting screw 105 in threaded engagement with one leg and having an end in engagement with the other leg of the spring 102 permits the spring force applied to the lever 21 to be varied. The spring 102 can accordingly be employed by preliminary or subsequent adjustment to apply a force towards the fulcrum provided by the plate 51. It will be noted that the spring strips 101 and 103 are mounted in alinement with the fulcrum plate 51.

In laminar flow, all fluid particles move in parallel lines without crosswise mixing, and the pressure loss or drop resulting from laminar flow is directly proportional to the average velocity in the cross section of the laminar flow passageway.

Fluid flowing through the primary metering device 10 produces a higher static pressure which is effective through the pipe 12 and in the bellows 22, and a lower static pressure which is effective through the pipe 14 and in the bellows 24. The differential of these pressures is effective on lever 21 and thereby exerts a control effect on the pilot valve 60 through the lever 75.

Pilot fluid is delivered by the pilot valve 60 at regulated pressure, to and through the pipe 73 to the laminar flow tube 85. The fluid is guided in the groove 94 in the rod 93 and laminar flow is established between the inner end of the rod 93 and the vent 90. The fluid with laminar flow passes along the groove 94 and produces a pressure drop in the portion of the groove 94 between the gap 90 and the outer end of the sleeve 89. This pressure drop is a first power function of the velocity of the pilot fluid in the laminar flow groove 94 and is effective through the vent 90 and may be read on the instrument I. The dial of the instrument I may be calibrated in linear units.

The fluid in the groove 94 discharging at the outer end of the sleeve 89 is effective in the impact portion of the groove 94 provided within the collar 95, and sets up, in the passageways 95 and 97 and the pipe 99, a pressure which, for a particular setting of the collar 95 with respect to the sleeve 89, is a second power function of its velocity. The pressure effective within the pipe 99 is applied in the interior of the bellows 42, and is effective, through the ball connection 44, as a force applied on the lever 21 in opposition to the force applied by the primary metering device. The differential effective from the primary metering device on the lever 21 is proportional to the second power of the fluid flow to be measured.

For a particular flow, a differential will be established effective against the lever 21 and opposing this, for balanced conditions and for equilibrium, an equal force will be exerted by the bellows 42 against the lever 21. The valve member 67 of the pilot valve 60 will be positioned to control the pressure of the fluid supplied to the pipe 73. The pressure of the pilot fluid available for laminar flow is thus determined and this pressure, in turn, determines the pressure applied in the bellows 42 to maintain equilibrium conditions. Upon a change in the rate of flow, the position of the pilot valve member 67 will be changed, with consequent change of pressure of the pilot fluid available for laminar flow and with change of pressure in the bellows 42 to balance or equalize the differential pressure from the primary metering device 10.

If $F_1$ = force applied by differential pressures of bellows 22 and 24;
$F_2$ = force applied by bellows 42;
$q_1$ = rate of flow to be measured;
$q_2$ = rate of flow of pilot fluid through laminar flow passageway 94; and
$K_1$ and $K_2$ represent constants covering such factors as densities of the measured fluid and of the pilot fluid; then $$F_1 = K_1 q_1^2$$

and $$F_2 = K_2 q^2{}_2$$

Since at equilibrium, the lever 21 is balanced under the action of these forces $F_1$ and $F_2$ with respect to the moment of these forces about the pivot provided by the strip or plate 51, then, if $l_1$=the moment arm of $F_1$;
$l_2$=the moment arm of $F_2$; and
$K_3$ and $K_4$ are constants as before;

$$F_1 l_1 = F_2 l_2$$

From this it will be seen that $$K_1 l_1 q_1{}^2 = K_2 l_2 q_2{}^2$$

or $$K_3 q_2 = K_4 q_1$$

Thus, the flow of pilot fluid through the laminar flow passageway 94 is proportional to the flow to be measured by the primary metering device. The friction loss through the laminar flow passageway 94 is a linear or first power function of the rate of flow through this passageway so that there is available, at the vent or take-off opening 90, a pressure relative to atmospheric pressure which is proportional to the rate of flow of air $q_2$ in the laminar flow passageway 94, and, in turn, proportional to the rate of flow $q_1$ in the primary metering decvie 10.

It will be noted that the bellows 42 is adjustably positioned on the bracket 35 so that the ball 44 may be positioned to vary the lever arm of the force applied on the lever 21 by the bellows 42, thus accommodating the maximum pressure from the take-off connection 91 to various values of maximum pressure difference in the bellows 22 and 24.

The spring 26 is preferably employed for zero setting of the lever system.

The bellows 22, 24 and 42, the spring 26, and the fulcrum plate 51 all present spring resistance to the movement of the lever 21. The lever 21 takes a different position for each particular rate of flow and since the elements providing this spring resistance are all stressed in direct proportion to the displacement, their combined effect is to force the lever 21 back towards its initial position and thus create errors in the results. In other words the effect of the spring elements is to make the instrument too stable. To cancel or balance out this spring resistance, and to gain sensitivity, the spring 102 and its adjusting screw 105 are employed to provide a compensatory instability. In the initial position of the lever 21, the line of action of the thrust from the spring 102 is through or nearly through the fulcrum plate 51. As the lever 21 and the arm 100 turn about the pivot point provided by the fulcrum plate 51, a line drawn through the pivot point at the plate 103 and the plate 101 will miss the pivot point of the plate 51 by an amount which increases with increase of the movement of the lever 21 in a substantially linear manner, and the reaction of the spring 102 has a lever arm about the fulcrum plate 51 which increases with increasing movement in a substantially linear manner. The spring 102 thus produces instability which upsets the excessive stabilizing effect of the other spring elements acting on the lever 21. The direction or sense of the moment of the spring force of the spring 102 about the fulcrum of the plate 51 is opposed to the direction or sense of the moments of the other spring forces referred to, and hence the two moments may be made to equalize each other and cancel out.

It will also be noted that the rod 93 may be readily removed from the sleeve 89 for cleaning and that the collar 95 and rod 93 may be moved to provide adjustment of the width of the gap at the end of the passageway 94 between the outer end of the sleeve 89 and the collar 95.

I claim:

1. Laminar flow control means comprising a rod member, an enclosing member with which said rod is in continuous fixed contacting surface engagement along the length of the enclosing member and within which said rod member extends, one of said members having longitudinally extending therealong and offset from its bounding surface a capillary passageway for laminar flow bounded by said other member and extending beyond said other member and having a part of said capillary passageway in communication with the atmosphere, a connection to a source of pressure fluid in communication with one end of said passageway remote from said part, valve means interposed between said connection and said passageway for controlling the pressure of the fluid supplied to said one end of said passageway, means connected to said passageway intermediate its ends responsive to the pressure of the fluid in said passageway, means for receiving fluid discharged from the other end of said passageway including a member disposed beyond said part of said passageway and into which another part of said passageway extends, and means including a portion in communication with said part of said passageway in said last member for controlling said valve means.

2. Laminar flow control means comprising a rod, an exterior sleeve within which said rod extends and in continuous fixed contacting surface engagement along its length with said rod, said rod having on the outer surface and extending inwardly from said sleeve a longitudinally extending laminar flow capillary passageway, said rod having a portion extending outwardly beyond said sleeve and having a continuation of said passageway thereon with a part in communication with the atmosphere, a connection to a source of pressure fluid in communication with the end of said passageway remote from said rod portion, valve means interposed between said connection and said passageway for controlling the pressure of the fluid supplied to said passageway, means connected to said passageway intermediate its ends responsive to the pressure of the fluid in said passageway, means on said portion including a member beyond said part into which another part of said continuation extends, and means including a portion in communication with said part of said continuation in said last member for controlling said valve means.

3. Laminar flow control means comprising a housing, a sleeve having an inner end portion in said housing and extending outwardly therefrom, a rod in said sleeve and in continuous contacting surface engagement along its length with said sleeve, said rod having on the outer surface thereof and extending inwardly from said sleeve a longitudinally extending laminar flow capillary groove, said rod extending inwardly in said housing and having a portion extending outwardly beyond said sleeve with a continuation of said groove thereon and with a part of said groove in communication with the atmosphere, a connection to a source of pressure fluid in communication with the end of said groove remote from said part, valve means interposed between said connection and said end of said groove for controlling the pressure of the fluid supplied to said end of said groove, means connected to said groove at the inner end portion of said sleeve responsive to the pressure of the fluid in said groove, means responsive to the discharge of fluid from the other end of said groove including a member beyond said part on said rod portion into which another part of said continuation extends, said rod having a longitudinal discharge passageway in communication with said groove within said last member, and means including a portion communicating with said discharge passageway in said last member for controlling said valve means.

4. The combination comprising a control lever having a fulcrum, resilient fluid pressure responsive members connected to said control lever at predetermined locations for applying a differential force on said control lever, fluid pressure transmitting means controlled by the movement of said control lever, fluid pressure responsive means connected to said pressure transmitting means and to said control lever at a predetermined location for resiliently applying a force on said control lever in opposition to the force applied by said differential force applying resilient members, an additional fluid pressure responsive member controlled by pressure from said transmitting means, said resilient members and resilient applying means providing moments on said control lever tending to stabilize said control lever and restore said control lever to a position of equilibrium, an abutment spaced from said fulcrum, an arm extending from said control lever and having a portion in a line from said abutment to said fulcrum, and a resilient member interposed between said portion and said abutment and applying a force in said line towards said fulcrum, said resilient member applying a moment on said control lever about said fulcrum which increases upon deflection of said arm from said line.

5. The combination defined in claim 4 in which said last mentioned resilient member comprises a spring having a member for adjusting the spring force thereof.

6. The combination defined in claim 4 in which said last mentioned resilient member comprises a U-shaped spring having end portions disposed in said line and a member in engagement therewith for adjusting the spring force thereof.

7. The combination defined in claim 4 in which the last mentioned resilient member comprises a U-shaped spring having end portions disposed in said line and a threaded stud in engagement with one leg for contact with the opposite leg.

References Cited in the file of this patent
UNITED STATES PATENTS

| | | |
|---|---|---|
| 909,176 | Fulton | Jan. 12, 1909 |
| 1,186,180 | Fulton | June 6, 1916 |
| 1,487,989 | Vose | Mar. 25, 1924 |
| 1,507,591 | Frankenberg | Sept. 9, 1924 |
| 1,638,101 | Roucka | Aug. 9, 1927 |
| 1,879,197 | Greenwald | Sept. 27, 1932 |
| 2,408,685 | Rosenberger | Oct. 1, 1946 |
| 2,494,781 | Stover | Jan. 17, 1950 |
| 2,502,776 | Burdick | Apr. 4, 1950 |
| 2,508,623 | Schaeffer | May 23, 1950 |
| 2,509,078 | Stover | May 23, 1950 |
| 2,535,202 | Gregory et al. | Dec. 26, 1950 |

OTHER REFERENCES

Fluid Meters, Their Theory and Application, part 1, Report of A. S. M. E. Special Research Committee on Fluid Meters, by The American Society of Mechanical Engineers, 1924, pp. 11, para. 19, 20 and p. 13, para. 38.